United States Patent [19]

Han

[11] Patent Number: 5,266,617
[45] Date of Patent: Nov. 30, 1993

[54] LEWIS BASE CATALYZED PHASE TRANSFER COATING PROCESS FOR POLYANILINES

[75] Inventor: Chien-Chung Han, Madison, N.J.

[73] Assignee: AlliedSignal Inc., Morristown, N.J.

[21] Appl. No.: 689,421

[22] Filed: Apr. 22, 1991

[51] Int. Cl.$^5$ .............................................. G08K 5/36
[52] U.S. Cl. ..................................... 524/392; 528/422
[58] Field of Search .......................... 524/392; 528/422

[56] References Cited

U.S. PATENT DOCUMENTS

| | | | |
|---|---|---|---|
| 3,963,498 | 6/1976 | Trevoy | 430/631 |
| 4,025,463 | 5/1977 | Trevoy | 528/229 |
| 4,615,829 | 10/1986 | Tamura et al. | 252/500 |
| 4,798,685 | 1/1989 | Yaniger | 252/500 |
| 4,806,271 | 2/1989 | Yaniger et al. | 252/500 |
| 4,822,638 | 4/1989 | Yaniger | 427/79 |
| 4,851,487 | 7/1989 | Yaniger et al. | 525/540 |
| 4,855,361 | 8/1989 | Yaniger et al. | 525/488 |
| 4,959,180 | 9/1990 | Armes et al. | 528/422 |
| 5,008,041 | 4/1991 | Cameron et al. | 528/422 |

FOREIGN PATENT DOCUMENTS

| | | |
|---|---|---|
| 0035713 | 2/1981 | European Pat. Off. |
| 0152632 | 12/1984 | European Pat. Off. |
| 0259813 | 9/1987 | European Pat. Off. |
| 399299 | 6/1988 | European Pat. Off. |
| 62/12073 | 2/1989 | Japan |
| 62/47109 | 4/1990 | Japan |
| WO8901694 | 8/1989 | PCT Int'l Appl. |
| WO9010297 | 9/1990 | PCT Int'l Appl. |

OTHER PUBLICATIONS

A. G. Green et al., "CCXLII–Aniline-black and Allied Compound" Part I., *Green and Woodheat; Aniline Black*, pp. 2388–2402, 1907.
A. G. MacDiarmid et al., "The Polyanile Processing, Molecular Weight, Oxidation State and Derivatives", Polymer Preprints, *American Chemical Society*, vol. 30, No. 1, pp. 144–147, (1989).
X. Tung et al., "Molecular Weight of Chemically Polymerized Polyaniline", *Makromol. Chem. Rapid Commun.* 9, pp. 829–834, (1988).
Karl, F. et al. "Spectroscopic and Morhological Characterization of Polyanile Tosylate Thin Films", pp. 317–318, (1987).
I. Motomichi et al., "New Soluble Polyanile"; Synthesis, Electrical Properties and Solution Electronic Spectrum *Synthetic Metals*, 30, pp. 199–207, (1989).
M. Toatsu, "Report No. 8: Electroconductive Polymers (Update–I)", *Japanese R&D Trend Analysis*, Advanced Materials–Phase II pp. 47–51, (Dec. 1990).
T. Masatake et al; "Secondary batteries with polyaniline cathods" *Chemical Abstracts*, vol. 109, No. 6, & Jpn. Kokai Tokkyo Koho JP 63 55,861 (88 55,861) Mar. 10, 1988.
Chan et al., Thermal Analysis of Conducting Polymers Part I, *Journal of Therm Analysis*, 35 765–774 (1989).
Jen et al., Intl' Appl. #PCT/US88/02319.
S. Li et al. "Soluble Polyaniline" Synthetic Metals, 20 (1987) 141–149.
K. Hyodo et al. "Short Communication . . . High Ion Selective Electric chemical . . . " Electro Acia vol. 33, No. 1, pp. 165–166, 1983.
L. T. Yu et al. "Conductivite et Constitution Chimique pe Semi Conducteurs Macromoleculaires" Revue Generale de l'Elec . . . vol. 75, No. 9/p. 10 1019.
M. Jozefowicz et al. "Relations entre Proprietes Chimiques et . . . " Revue Generale de l'Electricite vol. 75, No. 9, pp. 1008–1013.
D. Muller et al. "Preparation, Proprietes Chimiques et Conduct" . . . pp. 4087–4091.

(List continued on next page.)

Primary Examiner—Paul R. Michl
Assistant Examiner—Edward Cain
Attorney, Agent, or Firm—R. C. Stewart, II; G. H. Fuchs; D. W. Webster

[57] ABSTRACT

This invention relates to a Lewis base catalyzed phase transfer coating process for coating a substrate with an acid substituted polyaniline.

34 Claims, No Drawings

OTHER PUBLICATIONS

L. T. Yu et al. "Etude experimentale de la Conductivite en Couran Continu des Composes Macromoleculaires" No. 16/p. 29312942 Jrnl. Polymer Sc. Pt C.

M. Jozefowicz et al. "Proprietes Nouvelles des Polymeres Semi . . . " J. Poly. Sci. Part C/No. 22, pp. 1187–1195 (1969).

T. Kobayashi et al. "Electrochemical Reactions Concerned with Electrochromism . . . " J. Electroanal Chem. 177/(1984) pp. 281–291.

T. Kobayashi et al. "Oxidative Degradation Pathway of Polyanil Film Electrodes" J. Electroanal Chem. 177 (1984) pp. 293–297.

F. Cristofini et al. "Proprietes Electrochimiques des Sulfates de Polyaniline" C.R. Acad. Sc. Paris, t. 268 pp. 1346–1349 (Apr. 14, 1969).

D. Labarre et al. "Polymeres Conducteurs Organiques Filmogenes a base de Polyaniline" C.R. Acad. Sc. Paris, t. 269 (Oct. 29, 1969) pp. 964–969 Series 2.

M. Doriomedoff et al. "conductivite en Courant Continu des Sulfates de Polyanilines" (#142) pp. 1055–1069.

L-T Yu et al. "Conductivite en Courant Continu des Materiaux Macromoleculaires" pp. 470–532 (Chapter 11).

R. de Surville et al. "Produits Oligomers et Polymeres d'Oxydation des Amines Aromatiques" Ann. Chim. t2, 1967, pp. 5–13.

R. de Surville, "Electrochemical Chains Using Protolytic Organic Semiconductors" Elec. Acta 1958 vol. 13, pp. 1451–1458.

R. de Surville, "Produits d'oxidation Pousée des Amines Aromatiques" Ann. Chime, t2, 1967, pp. 149–157.

LEWIS BASE CATALYZED PHASE TRANSFER COATING PROCESS FOR POLYANILINES

BACKGROUND OF THE INVENTION

1. Field of the Invention

This invention relates to a Lewis base catalyzed phase transfer coating process for acid substituted polyaniline homopolymers or copolymers, and to compositions for use in the process. Another aspect of this invention relates to a method of using such compositions and processes to form polymer articles, such as films, coatings and parts.

2. Description of the Prior Art

There has recently been an increased interest in the electrochemistry and electrical phenomena of polymeric systems. Recently, work has intensified with backbone polymers having extended conjugation in at least one backbone chain.

One conjugated polymer system currently under study is polyaniline. Kobayashi, et al., *J. Electroanal, Chem.*, "Electrochemical Reactions Concerned with Electrochromism of Polyaniline Film-Coated Electrodes", 177 281–291 (1984), describes various experiments in which spectro electro-chemical measurement of a polyaniline film coated electrode were made. French Patent No. 1,519,729; French Patent of Addition 94,536; U.K. Patent 1,216,549; "Direct Current Conductivity of Polyaniline Sulfate", M. Doriomedoff, F. Kautiere - Cristofini, R. De Surville, M. Jozefowicz, L-T. Yu, and R. Buvet, *J. Chim, Phys, Physicochim, Biol*, 68, 1055 (1971); "Continuous Current Conductivity of Macromolecular Materials", L-T. Yu, M. Jozefowicz, and R. Buvet, *Chim, Macromol*, 1, 469 (1970); "Polyaniline Based Filmogenic Organic-Conductor Polymers", D. LaBarre and M. Jozefowicz, *C.R. Acad, Sci., Ser. C*, 269, 964 (1969); "Recently discovered Properties of Semiconducting Polymers", M. Jozefowicz, L-T. Yu, J. Perichon, and R. Buvet, *J. Polym, Sci.*, Part C, 22, 1187 (1969); "Electrochemical Properties of Polyaniline Sulfates", F. Cristofini, R. De Surville, and M. Jozefowicz, *C.R. Acad, Sci., Ser. C*, 268, 1346 (1979); "Electrochemical Cells Using Protolytic Organic Semiconductors", R. De Surville, M. Jozefowicz, L-T. Yu, J. Perichon, R. Buvet, *Electrochem, Acta.*, 13, 1451 (1968); "Oligomers and Polymers Produced by Oxidation of Aromatic Amines", R. De Surville, M. Jozefowicz, and R. Buvet, *Ann. Chem.* (Paris) 2 5 (1967); "Experimental Study of the Direct Current Conductivity of Macromolecular Compounds", L-T. Yu, M. Borredon, M. Jozefowicz, G. Belorgey, and R. Buvet, *J. Polym, Sci, Polym. Symp.*, 16, 2931 (1967); "Conductivity and Chemical Properties of Oligomeric Polyaniline", M. Jozefowicz, L-T. Yu, G. Belorgey, and R. Buvet, *J. Polyam. Sci, Polym. Symp*, 16, 2943 (1967); "Products of the Catalytic Oxidation of Aromatic Amines", R. De Surville, M. Jozefowicz, and R. Buvet, *Ann, Chim.* (Paris), 2, 149 (1967); "Conductivity and Chemical Composition of Macromolecular Semiconductors", *Rev. Gen. Electr.*, 75 1014 (1966); "Relation Between the Chemical and Electrochemical Properties of Macromolecular Semiconductors", M. Jozefowicz and L-T. Yu, *Rev. Gen. Electr.*, 75 1008 (1966); "Preparation, Chemical Properties, and Electrical Conductivity of Poly-N-Alkyl Anilines in the Solid State", D. Muller and M. Jozefowicz, *Bull. Soc. Chem.*, *Fr.* 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductors compositions having bulk electrical conductivities up to about $7 \times 10^{-3}$ S/cm and, surface resistivities of $4 \times 10^7$ ohm/square. European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and a suitable binder polymer.

U.S. Pat. No. 4,855,361 describes a conductive polymer blend which comprises mixing a polyimide with a base-type polymer containing carbon nitrogen linkages, such as polyaniline, having a polyimide-like group covalently linked to the nitrogen atoms of the base-type polymer. The conductive polymer blend is formed by first reacting a base-type non-conductive polymer containing carbon-nitrogen linkages, such as polyaniline, with a carbonyl anhydride, such as 3,3',4,4'-benzophenone tetracarboxylic dianhydride to form a conductive polymer containing polyimide-like groups conveniently linked to the nitrogen atoms of the base-type polymer mixing such conductive polymer with non-conductive polyamide in a suitable solvent, removing the solvent, and forming a conductive continuous phase blend of the polyimide and the conductive polymer.

U.S. Pat. No. 4,798,685 describes the production of base-type conductive polymers, particularly from the family of conductive polyaniline, by reacting a base-group non-conductive polymer containing carbon-nitrogen linkages, e.g. polyaniline, with an R+ donor compound, where R is an organic group, e.g. methyl iodide, and forming an electrically conductive polymer in which the R groups are covalently linked to the nitrogen atoms of the polymer.

U.S. Pat. No. 4,806,271 describes the production of base-type conductive polymers, particularly from the family of conductive polyaniline, by reacting a base-type non-conductive polymer containing carbon-nitrogen linkages e.g., polyaniline, with a cation donor compound, such as $R_2SO_4R$, $R'SO_2Cl$ or $R''_3SiCl$, where R, R' and R" are alkyl or aryl, such as dimethyl sulfate or tosyl chloride, and forming an electrically conductive polymer in which the R groups of $R_2SO_4$ and $R'SO_2$ groups of $R'SO_2Cl$ or the $R''_3Si$ groups of $R''_3SiCl$ are covalently linked to the nitrogen atoms of the polymer.

U.S. Pat. No. 4,822,638 describes a process for fabricating an electronic device on a non-conductive polymer substrate, particularly from the family of polyaniline, which comprises applying a covalent doping agent, such as an R+donor compound, where R is an organic group, e.g., methyl iodide, to a preselected portion of a base-type non-conductive polymer substrate containing carbon-nitrogen linkages, and converting such preselected portion of the polymer substrate to an electrically conductive polymer portion, by covalent linkage of the R groups of such donor compound, to the nitrogen atoms of the non-conductive polymer substrate. Electronic devices, such as resistors, capacitors, inductors, printed circuits and the like, can be provided by the invention process, in the form of light-weight polymers containing no metal and which are stable and wherein the conductive portions are non-diffusing.

U.S. Pat. No. 4,851,487 describes the production of base-type conductive polymers, particularly from the family of conductive polyaniline, by reacting a base-type non-conductive polymer containing carbon-nitrogen linkages, e.g., polyaniline, with an anhydride such as R—SO$_2$—O—SO$_2$—R', R—CO—O—CO—R', R—CO—O—SO$_2$R' or mixtures thereof, where R and R' are alkyl or aryl, e.g., tosylic anhydride or benzophenone tetracarboxylic dianhydride, and forming an electrically conductive polymer in which the SO$_2$R and COR groups are covalently linked to the nitrogen atoms of the conductive polymer and the anion of the conductive polymers is the SO$_3$R' or O$_2$CR' group.

U.S. Pat. No. 4,798,685 describes the production of base-type conductive polymers, particularly from the family of conductive polyaniline, by reacting a base-type non-conductive polymer containing carbon-nitrogen linkages, e.g., polyaniline, with an R+ donor compound, where R is an organic group, e.g., methyl iodide, and forming an electrically conductive polymer in which the R groups are covalently linked to the nitrogen atoms of the polymer.

PCT WO89/01694 describes various of electrically conductive polyaniline doped with certain sulfonated dopants materials such as para-toluene-sulfonic acid. It is disclosed that these materials are thermally stable and can be melt blended with other polymers to form blends.

SUMMARY OF THE INVENTION

One aspect of this invention relates to a method of coating a substrate with polyaniline having one or more acid functions substituted thereto, which method comprises the steps of:

(a) forming a composition comprising one or more polyanilines having one or more acid substituents and a catalytically effective amount of one or more Lewis bases thereby forming a solution phase comprising said liquid and an effective amount of a complex of said polyanilines and said bases dissolved therein;

(b) contacting all or a portion of a surface of a substrate with said solution phase;

(c) separating said substrate from said solution phase; and (d) removing all or a portion of said liquid from said solution phase residue on said substrate.

Another aspect of this invention relates to a composition for use in phase transfer coating on a surface of a substrate with polyaniline having at least one acid function substituted thereto. The composition comprises liquids, one or more polyanilines substituted with one or more acid functions, and a solution phase comprising a liquid and an effective amount of a complex of at least one polymer chain of said polyanilines and one or more "effective Lewis bases" dissolved therein.

Through use of this invention, acid substituted polyanilines can be conveniently coated onto suitable substrates. One advantage of this invention flows from the phase transfer aspects which requires smaller amounts of Lewis base and a solution phase containing lower concentrations of the complex in contact with indissolved, solid polyaniline. The concentration of the complex in the solution phase can be maintained at the desired level as the solution phase is contacted with the substrate by incremental addition of additional liquid and Lewis base.

DETAILED-DESCRIPTION OF THE INVENTION

The process of this invention comprises four essential steps. The first step comprises forming a composition comprising a solvent, one or more polyanilines having at least one acid substituent on a polymer chain, and a "catalytically effective amount" of one or more "effective Lewis bases" to form mixture comprising said indissolved polyaniline and a solution phase comprising an effective amount of the acid/base complex of said Lewis base and said polyaniline dissolved therein. One essential ingredient is a polyaniline containing at least one acid substituent bonded directly or via an organic or inorganic radical to the aromatic ring and/or to the nitrogen of the polymer backbone. Any form of such polyanilines can be conveniently used in the practice of this invention. Illustrative of useful forms are those described in Green, A.G. and Woodhead, A.E., CXVII-Aniline-black and Allied Compounds, Part II", *J. Chem. Soc.*, 101 pp. 1117 (1912) and Kobayashi, et al., "Electrochemical Reactions . . . of Polyaniline Film-Coated Electrodes", *J. Electroanal, Chem.*, 177, pp. 281-91 (1984) and in Shacklette, L.W., et al. "Structure and Properties of Polyaniline as Modeled by Single-Crystal Oligomers", *J. Chem. Phys*, 88 P 3955 (1988), which are hereby incorporated by references. For example, unsubstituted and substituted polyaniline, useful forms, which are characterized by different ratios of phenylene amine and quinone imine backbone segments include leucoemeraldine, protoemeraldine, emeraldine, nigraniline and pernigraniline.

In the preferred embodiments of the invention, polyanilines for use in the invention are homopolymers and copolymers of the type derived from the polymerization of unsubstituted and substituted anilines of the Formula I:

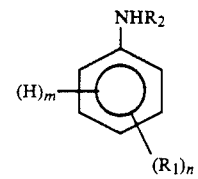

wherein:

n is an integer from 0 to 5;

m is an integer from 0 to 5 with the proviso that the sum of n and m is equal to 5;

R$_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkanoyloxy, alkylaryl, arylalkyl, amino, alkylamino, dialkylamino, aryl, alkylsulfinyl, arylamino, diarylamino, aroyloxy, aryloxyalkyl, alkylsulfinylalkyl, alkoxyalkyl, alkylsulfonyl, arylthio, aroyl, alkylsulfonylalkyl, boric acid, sulfinate, arylsulfinyl, alkoxycarbonyl, arylsulfonyl, carboxylic acid, phosphonic acid, halo, hydroxy, cyano, sulfinic acid, sulfinic acid salt, carboxylate, borate, phosphate, sulfonate, phosphinate, phosphinic acid salt, phosphonate, phosphonic acid salt, phosphinic acid, sulfonic acid, nitro, alkylsilane, alkyl or alkoxy or aryloxy or aryl substituted with one or more phosphonic acid, diarylamino, sulfonic acid, boric acid, sulfinate, sulfinic acid salt, carboxylate, borate, sulfinic acid, sulfonate, phosphinate, phosphinic acid salt, phosphonate, phosphonic acid salt, arylalkylamino, phosphate, phosphinic acid, arylamino, carboxylic acid, halo, nitro, amino, alkylamino, dialkylamino, cyano or epoxy moieties, or one or more $R_1$ group or an $R_1$ group together with any $R_2$ group may form a substituted or unsubstituted alkylene, alkynylene or alkenylene chain completing a 3, 4, 5, 6, 7, 8, 9 or 10 membered aromatic, heteroaromatic, alicyclic or heteroalicyclic ring, which ring may optionally include one or more divalent nitrogen, sulfur, sulfinyl, ester, carbonyl, sulfonyl, phosphorus or oxygen atoms wherein permissible substituents are as described above; or $R_1$ or $R_2$ is an aliphatic moiety having repeat units of the formula:

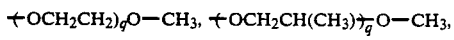

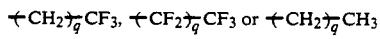

wherein q is a positive whole number; and $R_2$ is the same or different at each occurrence and is selected from the group consisting of $R_1$ substituents or hydrogen;

with the proviso that at least one of $R_1$ or $R_2$ is an acid moiety or is an inorganic or organic radical substituted with one or more acid moieties.

Illustrative of the polyanilines useful in the practice of this invention are those of the Formulas II to V:

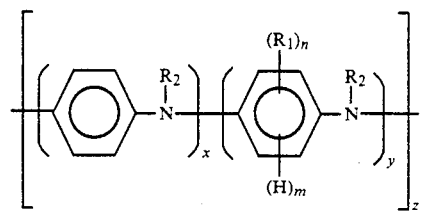

or

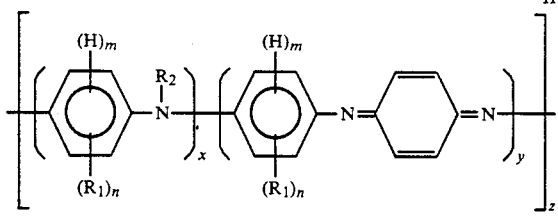

or

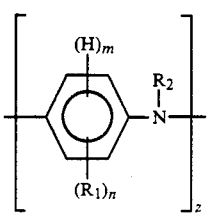

or

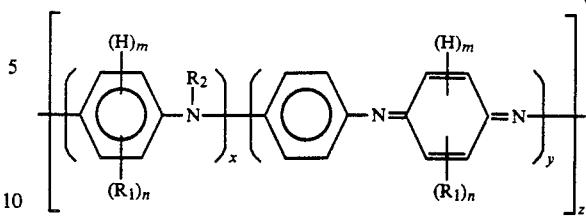

wherein n, m, $R_1$ and $R_2$ are as described above;

x and y are the same or different at each occurrence and are integers equal to or greater than 0, with the proviso that the sum of x and y is greater than 0, preferably were x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than 1.

Exemplary of useful $R_2$ groups are hydrogen, alkyl such as methyl, ethyl, isopropyl, butyl, isobutyl, hexyl, and the like, and substituted alkyl or aryl such as alkyl and aryl substituted with one or more acids such as methyl sulfonic acid, propylsulfonic acid, ethyl sulfonic acid, butyl sulfonic acid, butyl phosphonic acid, butyl phosphinic acid, phenyl sulfonic acid, benzyl sulfonic acid, butyl carboxylic acid, octyl carboxylic acid, benzoic acid and the like.

Illustrative of useful $R_1$ groups are deuterium, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethoxy, octoxy, and the like; cycloalkenyl such as cyclohexenyl, cyclopentenyl and the like; alkanoyl such as butanoyl, pentanoyl, octanoyl, ethanoyl, propanoyl and the like; alkylsulfonyl, alkylsulfinyl, alkylthio, arylsulfonyl, arylsulfinile, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxymethyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxy-butyl, cyanomethyl, 3-chloropropyl, 4-nitrophenyl, 3-cyanophenyl, and the like; acid functional groups or their salt derivatives such as sulfonic acid, carboxylic acid, phosphonic acid, boric acid, sulfinic acid, sulfinate, sulfinic acid salt, phosphonate, phosphinic acid salt, phosphonic acid salt, phosphinic acid, phosphoric acid, borate, carboxylate, sulfonate, phosphate and the like; alkyl or aryl groups substituted with acid functions and their salt derivatives such as ethylsulfonic acid, propylsulfonic acid, butylsulfonic acid, ethyl carboxylic acid, phenylsulfonic acid, phenylphosphonic acid, and phenylphosphinic acid, toluene sulfonic acid, benzoic acid and the like.

Also illustrative of useful $R_1$ groups are divalent moieties derived from any two $R_1$ groups or a $R_1$ group with an $R_2$ group such as moieties of the formula:

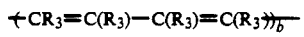

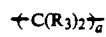

wherein a is an integer from about 2 to about 7, and b is an integer from 1 to 2 and $R_3$ is selected from among permissible $R_3$ substituents such as hydrogen or alkyl. Such divalent moieties include $+CH_2+_4$, $+CH_2+_3$, $+CH=CH-CH=CH+$, $+CH_2-CH(CH_3)-CH_2+$ and $+CH_2+_5$. Such moieties may also include heteroatoms of oxygen, nitrogen, phosphorus, ester, sulfonyl, carbonyl, sulfinyl, and/or sulfur forming divalent moieties such as $-CH_2SCH_2-$ $-CH_2NHCH_2-$, $-SCH_2NHCH_2-$, $-O(CH_2)_2O-$, $-O-CH_2-S-CH_2-$, $-CH_2S(O_2)CH_2-$, $-CH_2S(O)CH_2-$, $-OC(O)CH_2CH_2-$, $-CH_2C(O)CH_2-$ and $-CH_2-O-CH_2-$ which form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydrobenzothiazineamine, benzothiopyranamine, dihydrobenzoxazoleamine, benzodiazineamine, benzodiazoleamine, benzothiazepineamine, benzoimidazolylamine, benzoxazoleamine, benzoisoxazoleamine, benzoxazolylamine, benztriazineamine, benzoxazineamine, naphthaleneamine, benzopyranamine, benzothiazineamine, anthraceneamine, aminobenzothiopyran, aminobenzodiazine, benzothiopyrone amine, aminocoumarin, benzothiophene amine, benzothiodiazoleamine, and the like.

Preferred for use in the practice of this invention are polyanilines of the above Formulas II to V in which:

n is an integer from 0 to about 3;

m is an integer from 1 to 4, with the proviso that the sum of n and m is equal to 4;

$R_1$ is alkyl, aryl or alkoxy having from 1 to about 30 carbon atoms, sulfinic acid, sulfinate, sulfinic acid salt, amino, alkylamino, dialkylamino, arylamino, diarylamino, hydroxyamino, hydroxy, phosphinate alkylsulfonyl, arylsulfonyl, sulfonic acid, sulfonate, phosphinic acid, phosphinic acid salt, phosphinate, carboxylic acid, carboxylate, phosphonic acid, phosphonate, phosphonic acid salt, cyano, halo, or alkyl, aryl or alkoxy substituted with one or more phosphonic acid, phosphoric acid, borate, sulfonate, carboxylate, phosphonate, phosphonic acid salt, boric acid, phosphinic acid, phosphinate, phosphinic acid salt, sulfinic acid, sulfinate, sulfinic acid salt, carboxylic acid or sulfonic acid substituents;

$R_2$ is the same or different at each occurrence and are hydrogen, sulfinic acid, sulfinic acid salt, sulfonate, sulfinate, sulfonic acid, phosphinic acid, phosphinate, phosphinic acid salt, carboxylic acid, carboxylate, phosphonic acid, phosphonate, phosphonic acid salt, or phenyl or alkyl substituted with sulfonic acid, sulfonate, phosphinic acid, phsophinate, phosphonic acid salt, carboxylic acid, carboxylate, sulfinic acid, sulfinate, sulfinic acid salt, boric acid, borate, phosphonic acid or phosphonate, phosphonic acid salt substituents;

x is an integer equal to or greater than 1;

y is equal to or greater than 0, with the proviso that the ratio of x to y is equal to or greater than 0.5;

z is an integer equal to or greater than about 5;

with the proviso that at least about 1 mole percent of recurring aromatic aniline functions (aromatic groups and/or amine group) in the polymer backbone (based on the total number of recurring groups) include $R_1$, $R_2$, or $R_1$ and $R_2$ substituents selected from the group consisting of sulfinic acid, sulfinic acid salt, sulfonic acid, sulfonate, phosphinic acid, phosphinic acid salt, boric acid, borate, phosphonic acid, phosphonic acid salt, carboxylic acid, carboxylate or an organic or inorganic radical substituted with one or more of the foregoing acid or acid salt functions.

Particularly preferred for use in the practice of this invention are polyanilines of the above Formulas II to V in which:

n is an integer from 0 to 2;

m is an integer from 2 to 4, with the proviso that the sum of n and m is equal to 4;

$R_1$ is alkyl, alkoxy, amino, alkylamino, dialkylamino, arylamino, diarylamino, hydroxyamino, hydroxy, alkylsulfonyl, arylsulfonyl, carboxylic acid, carboxylate, phosphinic acid salt, phosphinic acid, sulfonic acid, sulfonate, sulfinic acid, phosphonic acid, sulfinic acid salt, phosphonic acid salt, or alkyl substituted with carboxylic acid, phosphinic acid, sulfinic acid, phosphinic acid salt, halo, sulfinic acid salt, sulfonate, carboxylate, phosphonic acid, phosphonic acid salt, or sulfonic acid substituents; wherein the aliphatic components of $R_1$ substituents include from 1 to about 30 carbon atoms and the aryl components of any $R_1$ substituent include from 6 to about 30 carbon atoms $R_2$ is the same or different at each occurrence and are hydrogen, alkyl, carboxylic acid, amino, alkylamino, dialkylamino, arylamino, diarylamino, hydroxyamino, hydroxy, alkylsulfonyl, arylsulfonyl, sulfinic acid, sulfinic acid salt, carboxylate, phosphinic acid salt, sulfonic acid, phosphonic acid, sulfinic acid salt, phosphonic acid salt, or alkyl substituted with one or more carboxylic acid, sulfinic acid, sulfinic acid salt, carboxylate, phosphinic acid salt, phosphinic acid, sulfonic acid, sulfonate salt, phosphonic acid or phosphonic acid salt substituents; wherein the aliphatic components of any $R_2$ substituent include from 1 to about 30 carbon atoms and the aryl components of any $R_2$ substituent include from 6 to 30 carbon atoms x is an integer equal to or greater than 2;

y is equal to or greater than 0, with the proviso that the ratio of x to y is greater than about 1; and z is an integer equal to or greater than about 10;

With the proviso at least about 5 mole percent of recurring substituted or unsubstituted aromatic aniline units in the polyaniline backbone include in at least one $R_1$ or $R_2$ substituent is selected from the group consisting of carboxylic acid, boric acid, sulfinic acid, sulfinic acid salt, carboxylate, phosphinic acid salt, phosphinic acid, sulfonic acid-, sulfonate, phosphonic acid, phosphonic acid salt or an organic radical substituted with one or more of the foregoing.

Amongst the particularly preferred embodiments, most preferred for use in the practice of this invention are polyanilines of the above Formulas III or V in which:

n is an integer from 0 to 1;

m is an integer from 3 to 4, with the proviso that the sum of n and m is equal to 4;

$R_1$ is alkyl of from 1 to about 20 carbon atoms, carboxylic acid, carboxylate, sulfonic acid, sulfonate, sulfinic acid, sulfinic acid salt, phosphinic acid, phosphinic acid salt, or alkyl of from 1 to about 20 carbon atoms substituted with one or more halo, carboxylic acid, carboxylate, sulfonic acid, sulfonate, sulfinic acid, sulfinic acid salt, phosphinic acid or phosphinic acid salt, phosphonic acid, phosphonic acid salt, substituents;

$R_2$ is carboxylic acid, methyl, ethyl, carboxylate, carboxylic acid, sulfonic acid, sulfonate, sulfinic acid, phosphinic acid, phosphinic acid salt, sulfinate, phosphonic acid, phosphonic acid salt, salt or hydrogen;

x is an integer equal to or greater than 2; and y is equal to or greater than 1, with the proviso that the ratio of x to y is greater than about 1;

with the proviso that at least about 10 mole percent of recurring substituted or unsubstituted aromatic aniline units in the polyaniline backbone include at least one $R_1$ or $R_2$ substituent selected from the group consisting of carboxylic acid, carboxylate, sulfinic acid, sulfinic acid salt, phosphinic acid, phosphinic acid salt, sulfonic acid, sulfonate, phosphonic acid, phosphonic acid salt, or alkyl of from 1 to about 15 carbon atoms substituted with one or more carboxylic acid, carboxylate, sulfonic acid, sulfonate, phosphinic acid or phosphinic acid salt, phosphonic acid, phosphonic acid salt, substituents.

In the most preferred embodiments of this invention, the polyaniline is derived from aniline or N-alkylaniline substituted with at least one sulfonate, sulfonic acid, carboxylic acid or carboxylate function, with those embodiments in which the aniline moiety is substituted with at least one sulfonate or sulfonic acid group being the embodiments of choice.

In general, the number of aniline repeat units are not critical and may vary widely. The greater the number of aniline repeat units the greater the viscosity and molecular weight of the polyaniline. In those applications where a polyaniline of relatively low molecular weight and viscosity, such materials may be used, and in those applications where a polyaniline of relatively high molecular weight and viscosity is required, then such materials can be used. The number of repeat units is at least about 10. The upper limit can vary widely depending on the desired molecular weight and viscosity and the required degree of processibility is melt processibility, solution processibility and the like. In the preferred embodiments of the invention, the number of aniline repeat units is at least about 20, and in the particularly preferred embodiments, the number of repeat units is at least about 30. Amongst the particularly preferred embodiments, most preferred are those embodiments in which the number of repeat units is at least about 40.

Useful polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is purple in color and which has a conductivity of less than $10^{-8}$ S/cm. Other chemical procedures for preparation of various chemical forms of polyaniline are described in detail in Green et al and U.S. Pat. Nos. 4,855,361, 4,798,685, 4,806,271, 4,822,638, 4,851,487 and 4,940,517 described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The second essential ingredient of the composition is one or more "effective Lewis bases". As used herein, an "effective Lewis base" is a Lewis base which is capable of neutralizing one or more of the acid functions substituted to the nitrogen and/or aromatic moiety of the recurring aniline moieties directly or through some divalent linking group. While we do not wish to be bound by any theory, it is believed that the Lewis base neutralizes one or more of the acid functions substituted to the polyaniline forming the acid/base conjugate of the acid function and Lewis base. This reduces the interaction between polyaniline chains, therefore increasing their solubility in the liquid. Useful Lewis bases may be inorganic or organic compounds. Illustrative of useful inorganic Lewis bases are ammonium hydroxide, alkali metal and alkaline earth metal hydroxides, carbonates and bicarbonates such as sodium hydroxide, lithium hydroxide, potassium hydroxide, calcium hydroxide, magnesium hydroxide, barium hydroxide sodium carbonate, sodium bicarbonate, calcium carbonate, calcium bicarbonate, and the like. Useful Lewis bases also include organic bases such as alkali metal alkoxides such as sodium methoxide, potassium methoxide, sodium ethoxide, and the like; and primary, secondary and tertiary amines such as butylamine, propylamine, cyclohexylamine, 2,4-dimethylaniline, ethylmethylamine, trimethylamine, dimethylamine, morpholine, 2-picline, 3-picoline, 2-methyl amine, pyridine, pyrrolidine, 4-picoline, piperzaine, triphenylamine, diethylmethylamine, allylmethylamine, aniline, dibutylamine, 4-methylaniline, triethylamine, dibenzylethylamine, diethylamine, diisopropyl amine, diphenylmethylamine, dipropylamine, trisobutyl amine, tripropylamine, benzylamine, 1-aminopiperidine, 2,3-cylohexenopyridine, 1-(3-amino-propyl)-2-pipicoline, 1,1-dimethylhydrazine, propylamine, butylamine, ethylenediamine, N,N-dimethylethylene diamine, N,N'-dimethylethylenediamine, tetrahydrofurfurylamine, 1,2,3,4-tetrahydroisoquinoline, 2-imidazolidine, ammonia, ethylenediamine, cyclohexylamine, hexamethylenediamine, and the like.

The Lewis base is preferably relatively volatile which enhances the quality of conductive polyaniline coated substrates formed from the solution. As used herein "volatile" means that the Lewis base is liquid and has a boiling point of less than about 250° C. under use conditions or a solid which is soluble in the solvent and has a sublimation temperature of less than about 250° C. under use conditions. The lower limit of the boiling point or sublimation temperature is not critical and usually those bases with relatively lower boiling points or sublimation temperatures are employed. The boiling point or sublimation temperature of the Lewis base may vary and is preferably less than about 200° C., more preferably less than about 175° C. and most preferably less than about 150° C.

In the preferred embodiments of the invention, the Lewis base of choice is a liquid and is selected from the group consisting of amines, amides, and phosphoroamides. In the more preferred embodiments of the invention, the Lewis base of choice is selected from the group consisting of cyclic amines, secondary amines, tertiary amines, phosphoroamides and diamines. Such amines most preferred because they can complex with the preferred acid substituents of the polyaniline, and are relatively volatile and on casting of the solution phase in the desired form evaporate to form the desired coating. More preferred cyclic amines secondary and tertiary amines, phosphoramides and diamines are pyrrolidine, 2-picoline, 2,3-cyclohexenopyridine, 2-(methylamino)-pyridine, tetrahydroquinoline, N,N-dimethylethylene diamine, N,N'-dimethylethylene diamine, ethylene diamine, morpholine, piperidine, 2-pyrrolidinone, trimethylamine, triethylamine, tripropylamine, diethylamine, ethylmethylamine, hexamethyl phosphoramide, tetrahydrofurfurylamine and the like.

The composition includes an "effective amount" of one or more effective Lewis bases. As used herein, an "effective amount" of Lewis bases is an amount which is sufficient to neutralize a sufficient number of acid functions of the polyaniline such that the desired amount of neutralized polyaniline is dissolved in the solution phase. As used herein "dissolved" means that the amount of neutralized polyaniline in the solution phase is in a pure solution or in the form of suspended particles of having an average size of not more than about 150 nanometers.

The amount of Lewis base may vary widely provided that the amount is sufficient to complex with the acid functions of the polyaniline and dissolve at least one molecule of the complex in the solution phase. While we do not wish to be bound by any theory, it is believed that the Lewis base complexes with the acid functions of the polyaniline thereby forming the complex which dissolves in the solution phase. On removal of all or a portion of the Lewis base and the solvent, the polyaniline solidifies or precipitates to form the desired polyaniline coated substrate. The amount of Lewis base required depends to a significant extent on the number of acid functions on the polyaniline, and the solubility of the polyaniline/Lewis base complex in the solution phase. In general, the greater the amount of acid functions on the polyaniline, and the lower the solubility of the polyaniline/Lewis base complex in the solution phase, the greater the amount of Lewis base is required; conversely, the smaller the amount of acid functions on the polyaniline and the greater the solubility of the polyaniline/Lewis base complex in the solution phase, the smaller the amount of Lewis base is required. Usually, the amount of Lewis base is less than about 26 mole percent based on the total moles of repeat units of the employed polyaniline. The amount of Lewis base preferably is less than about 20 mole percent, more preferably less than about 10 mole percent and most preferably from about 0.01 about 5 mole percent on the aforementioned basis. In the embodiments of choice, the amount of Lewis base is from about 0.01 to about 2 mole percent on the aforementioned basis.

A third essential ingredient of the compositions is a solution phase containing a liquid solvent and dissolved polyaniline/Lewis base complex. Any solvent may be used provided that it dissolves some of the polyaniline/Lewis base complex this invention. The amount of polyaniline/Lewis base complex dissolved in the solution phase is not critical due to the catalytic nature of this invention and solutions having relatively low and relatively high amounts of dissolved complex can be used. Theoretically, the application of the coating can be performed if the solution phase contains at least one molecule of the polyaniline/Lewis base complex at the time of application of the solution to the substrate being coated. In general, the greater the concentration of the polyaniline/Lewis base complex in the solution phase, the shorter the processing time required for achieving a certain specified performance; and conversely the lower the concentration of the complex in the solution phase the longer the processing times. In general, the concentration of complex in the solution phase is less than about 20% by wgt based on the total weight of the polyaniline. Lower concentrations of the complex in the solution phase are not critical provided that the concentration levels do not adversely affect the process to a significant extent. Preferred concentrations of the complex in the solutions are less than about 10% by wgt, more preferred concentrations are less than about 5% by wgt and most preferred concentrations are less than about 2% by wgt on the aforementioned basis.

Solvents which are relatively polar are preferred because, in general, they can dissolve a relatively larger amount of the polyaniline/Lewis base complex and because they are more likely to dissolve polyaniline/Lewis base complex that contains relatively smaller Lewis base molecules. Such Lewis base molecules are in general more volatile and can be more easily removed after the application of the solution to the substrate.

Preferred solvents have a dielectric constants measured at room temperature (i.e. 10°-30° C.) equal to or greater than 2.2. Illustrative of such useful solvents are water; dimethylsulfoxide; amides such as formamide, acetamide, N,N-dimethyl formamide, N,N-dimethyl acetamide, N-methyl pyrrolidinone, pyrrolidinone, and the like; alcohols and glycols such as methanol, ethanol, propanol, butanol, pentanol, hexanol, octanol, glycol, glycerol, propanediol, benzyl alcohol, cresol, phenol, cyclohexanol, 2-methoxy ethanol, and the like; ketones, such as acetone, 2-butanone, 3-pentanone, cyclohexanone, 2,4-pentadione, acetophenone, benzophenone, and the like; amines, such as methylamine, dimethylamine, dipropylamine, triethylamine, dibenzyl amine, picoline, and the like; nitro compounds of aliphatic and aromatic hydrocarbons such as nitromethane, nitroethane, nitrobenzene, nitrotoluene, nitroaniline, tetranitromethane, and the like; halogenated aliphatic and aromatic hydrocarbons such as methylene chloride, chloroform, chloro methane, dibromo ethylene, trichloroethane, chlorobenzene, o-difluoro benzene, bromotoluene and the like; esters such as methyl formate, ethyl acetate, ethyl acetoacetate, methyl benzoate, benzyl acetate, ethyl oleate, butyl starate, methyl salicylate, dimethyl phthalate, and the like; ethers such as methyl ether, ethyl ether, phenyl ether, tetrahydrofuran, 1,4-dioxane, and the like; phosphates, such as tricresyl phsophate, and the like; and silicates such as tetraethylsilicate, and the like; More preferred solvents are those having a relative dielectric constant equal to or greater than about 3.0 such as water, dimethyl sulfoxide, amines, alcohols, ketones, and nitrohydrocarbons. Particularly preferred solvents are those having a relative dielectric constant equal to or greater than about 4.0, such as water, dimethyl sulfoxide, amines, and alcohols. The most preferred solvent is water due to environmental safety, and process economics.

In addition to the essential polyaniline, solvent and Lewis base, the composition of this invention may include other optional ingredients which either dissolve or do not dissolve in the solution. The nature of such optional ingredients can vary widely, and include those materials which are known to those of skill in the art for inclusion in polymer articles. In the case of dissolvable components, materials may be present which alter the physical or mechanical properties of either the solution or the articles eventually cast from the solution. Examples of such materials include other conventional polymers such as polycarbonate, polyacrylonitrile, polyvinyl chloride, polyvinylidene chloride, polyvinylidene fluoride, polyvinyl alcohol, polyethylene oxide, polystyrene, nylon 4, cellulose poly(1,4-cyclohexylidene dimethylene terephthalate), poly(phenylene sulfide), poly(ethylene terephthalate), poly(4-aminobutyric acid), poly(hexamethylene adipamide), poly(p-phenylene terephthalamide), sulfonated polystyrene, poly(2-methyl styrene), poly (4-phenylstyrene), poly($\beta$-vinyl naphthalene), poly (vinyl benzoate), poly(benzyl methacrylate) and the like, poly[methane bis(4-phenyl)carbonate], acetate butyrate, nylon 6, nylon 6,6, polypropylene, polyethylene, cellulose acetate, polyphenylene oxide, polyvinyl alcohol, and the like. In the case of nonsoluble fourth components, materials may be present which either fill or form a substrate for the conductive polymer cast from the solution. These fourth components include other conductive polymers, such as conjugated backbone polymers as for example polyacetylene, polyphenylene, polythiophene, and the like which may become conductive upon doping, graphite, meta conductors, reinforcing fibers and inert fillers (such as clays and glass).

The method of forming the composition of this invention is not critical and can vary widely. For example, one preferred method of forming the present composition containing the polyaniline homopolymer or copolymer is to react, simultaneously, the polyaniline and the Lewis base in water. Thus, for example, by introducing an acid substituted polyaniline such as sulfonated polyaniline as a solid powder, a suitable Lewis base, such as propylamine, pyrrolidine, pyridine, triethylamine, morpholine or piperidine as a Lewis base and water into a mixing vessel. A composition of the polyaniline solid, water, Lewis base and polyaniline/Lewis base complex dissolved in the aqueous phase is quickly formed. By contacting a suitable substrate with the aqueous phase, polyaniline in the aqueous phase can be cast onto a suitable substrate to form the desired coated substrate. The conditions of such mixing are not critical, provided that sufficient Lewis base such as propylamine, morpholine or piperidine is employed to form sufficient polyaniline/Lewis base complex dissolved in the aqueous phase. An alternate technique of preparing the composition of this invention containing an aqueous phase containing dissolved polyaniline/Lewis base complex is to mix first the polyaniline and water, thereafter add the Lewis base to the composition to form an aqueous phase containing dissolved polyaniline/Lewis base complex. Thus, for example, an acid substituted polyaniline such as sulfonated polyaniline powder is admixed with water for extended periods under normal conditions forming a suspension. The addition of a suitable Lewis base such as piperidine, morpholine or pyrrolidine to this suspension causes the Lewis base and sulfonated polyaniline to complex and if the sulfonated polyaniline and/or base are insoluble, almost instantaneously thereafter, causes all or portion of the complexed polyaniline and base to go into solution in the solution phase.

In the second and third steps of the process of this invention, the solution phase containing the dissolved polyaniline/Lewis base complex is placed on a substrate or in the form of an article as for example in a mold, and the liquid and the Lewis base are removed to form a film or coating on a substrate or an article in the form of the mold. Alternatively, the substrate can be placed in the above aqueous phase containing the dissolved polyaniline/Lewis base complex. Various methods can be contemplated for placing the solution phase on a substrate or in the form of an article, and any conventional procedure can be employed. The liquid can be removed from the solution through use of any conventional solvent or liquid removal method but is removed preferably by evaporation. Alternatively, the Lewis base and the solvent can be removed by extraction with an extractant in which the solvent and Lewis base are substantially more soluble than the acid substituted polyaniline. Other methods for removal of the solvent and complexed Lewis base from the solution phase known to those of skill in the art may be used.

As will be appreciated by those skilled in polymer processing, the ability to form polyaniline coated substrates by removing a liquid from a solution enables one to prepare coated substrates of a wide variety of shapes and sizes. Thus, for example, by removing the liquid and Lewis base from the present solution spread on a surface, films or coatings of any desired thickness can be formed on the surface. Extremely thin surface films or coatings can be prepared which are substantially transparent. It will be appreciated that some shrinkage might occur between the solution in it last flowable state to the final coated substrate, but such shrinkage is conventionally accounted for in molding polymers from solution. It is also contemplated that, once a solution is formed, a partial or substantial removal of solvent will occur prior to placing the solution on a surface, with the final venting of solvent occurring on the surface or in the mold. It is contemplated that, if fourth or additional soluble components are introduced into the solution, they will, unless also volatile, be present in the coating on the substrate. If the fourth component is a non-volatile liquid, then the removal of volatile components may leave a new liquid or plasticized form of doped conducting polymer or undoped neutral polymer. If the additional components are volatile, then foamed or expanded cellular forms of the polymer may be formed.

In the event that fourth or additional non-soluble components are present (or suspended) in the solution, the polyaniline will form around, or be filled with, the insoluble material. If, for example, the additional components are glass fibers, the relative amounts of fibers and remaining will cause either the polyaniline to be fiber-filled, the fibers to be coated or impregnated, or some intermediate composite of fibers and polyaniline to be formed. In the case of systems wherein the amount of non-soluble component greatly exceeds the remaining, individual particles or shapes of non-soluble components coated or impregnated with polymer will be formed.

On removal of the Lewis base from the complex, the protonic acid is reformed which then re-dopes the polyaniline forming a doped electrically conductive polyaniline film or coating on the substrate. In general, the mole percent of acid functions which are reform is sufficient to dope the polyaniline to an electrical conductivity of at least about $10^{-9}$ S/cm, preferably at least about $10^{-6}$ S/cm, more preferably at least about $10^{-3}$ S/cm and most preferably at least about $10^{-2}$ S/cm or at least about $10^{-1}$ S/cm.

In the preferred embodiments of the invention, the composition and process of this invention are used to place a coating of an acid substituted polyaniline on a substrate. The substrate may vary widely and may be an inorganic material or an organic material. In the preferred embodiments of the invention, the substrate is formed from a polymeric material, preferably containing a functional groups in the polymeric matrix for transferring of one or more of the acid functional group of the polyaniline from the complexed Lewis base. While we do not wish to be bound by any theory, it is believed that in these preferred embodiments of the invention, the Lewis base in the complex exchanges one or more of the acid functional group of the polyaniline with the functional group on the surface of the substrate such that such functional group complexes with one or more of the acid function in the polyaniline. The polyaniline precipitates or is absorbed on the surface of the substrate to form the desired polyaniline coated substrate. This results in enhanced adhesion of the polyaniline coating to the substrate.

The extent of exchange may vary widely. The greater the extent of exchange the greater the extent to which the polyaniline layer is bonded to the surface of the substrate; and conversely, the lesser the extent of exchange, the lesser the extent of bonding. In general, the extent of exchange is sufficient to bond the polyaniline coating to the substrate to any extent. In the preferred embodiments of the invention, the extent of exchange is from about 0.01 to about less than 100 mole percent based on the total moles of complexed acid functions. A higher degree of exchange is not preferred because exchange reduces the number of acid functions for self doping of the polyaniline. More preferred extent of exchange is from about 0.01 to about 50 mole percent based on the total moles of complexed acid functions, and most preferred extent of exchange in from about 0.01 to about 25 mole percent on the aforementioned basis.

In general, useful substrates are organic or inorganic materials containing nucleophilic functional groups, or some conjugated segments which are capable of interacting with protonic acids. Illustrative of such materials are polymers with nitrogen functional groups such as aliphatic polyamides as for example nylon 6, nylon 4, nylon 5, nylon 6,6, nylon 12, nylon 10, nylon 9, nylon 6,10 and the like, polyaramides such as poly(phenylene terephthalamide), poly(meta-phenylene isophthalamide) and the like; polyurethanes such as poly(tetramethylene hexamethylene diurethane), poly(-decamethylene hexadecamethylene diurethane), and the like; polyureas such as poly(hexamethylene octamethylene diurea), poly(paraphenylene dimethylene hexamethylene diurea) and the like; polyimides; and polyacrylamide. Useful polymeric materials also include oxygen containing polymers and copolymers such as polyesters as for example poly(ethylene terephthalate), poly(butylene terephthalate), poly(dimethylenecyclohexene terephthalate) and the like; polyvinyl alcohol; polyoxides such as polyethylene oxide, poly[2,2-bis(chloromethyl)-trimethylene-3-oxidel, poly(2,6-dimethyl-1,4-phenylene oxide) and the like, poly(2,6-diphenyl-1,4-phenylene oxide); phenolic resins; epoxide resins and the like. Illustrative of still other useful substrate materials are sulfur containing polymers such as polysulfides as for example poly(phenylene sulfide), poly(propylene sulfide), poly(ethylene sulfide), poly(styrene sulfide) and the like. Illustrative of polymers having conjugated segments are substituted or unsubstituted, fully or partially conjugated conducting polymers, such as polyacetylenes, polyphenylenes, polythiophenes, polyfuranes, polypyrroles, polyphenylene vinylenes, polythienylene vinylenes, polyfurylene vinylenes, polypyrrolylene vinylenes, and the like. Useful polymeric materials can also be copolymers or polymer blends consisting of one or more of the aforementioned nucleophilic functional group containing polymers or conjugation segment containing polymers. In these preferred embodiments of the invention, the copolymers or polymer blends forming the substrate may also contain other polymers which do not include nucleophilic functional groups or conjugated segments, with the proviso that the polymer matrix or surface contain at least about 0.001 wt percent of one or more of the aforementioned nucleophilic function containing polymers, or conjugation segment containing polymer or a combination thereof. Other useful, polymer materials for use as the substrate may be any substituted or unsubstituted, homopolymer or copolymer or terpolymers or polymer blends comprising one or more additives, such as plasticizers, coloring agents, or surfactants, which contain nucleophilic functional groups or conjugation segments. Useful substrate materials also include polymers blends having surface coatings, such as primers, dye compounds, anti-static reagents or anti-stain reagents which contain one or more nucleophilic functional groups and/or conjugated segments. Useful polymer materials can also be any conventional polymers which has been treated to form with one or more nucleophilic function groups or conjugated segments on the surface, such as polyethylene pretreated with chromic acid or nitric acid to form the hydroxy groups on the surface and with alkali or Lewis bases to form polyacetylene conjugated segments on the surface.

Suitable inorganic substrates include those whose surfaces have nucleophilic functionalities such as nitrogen, oxygen, sulfur, phosphorus, oxide, hydroxide and/or sulfide functions. For example, when the substrate is a metal, often the surface of the metal possesses an oxide and/or hydroxide layer which can exchange with the Lewis base in the complex. In some instances, these layers form on exposure of the substrate to oxygen, usually in air. However, suitable surface layers may also be form by treatment with a suitable agent as for example treatment with nitric acid, chromic acid, sodium hydroxide and the like.

Preferred for use in the practice of this invention are polymeric substrates, more preferred substrates are polymeric substrates having nitrogen in the polymer backbone or as a pendant function, and most preferred are those having a nitrogen with a pendant hydrogen such as nylon 6, nylon 6,6, and the like.

The process and composition of this invention can be used to form various types of electrically conductive articles useful for conventional purposes. Examples of articles formed from non-soluble components and the present polymer solutions where the article is coated with a conductive polymer film for shielding purposes. Such articles include conductive polymer coated-housings for sensitive electronic equipment (microprocessors), infrared and microwave absorbing shields, flexible electrical conducting connectors, conductive bearings, brushes and semiconducting photoconductor junctions, antistatic materials for packaging electronic components, carpet fibers, waxes for floors in computer rooms and an antistatic spray finisher for plastics, and thin, optically transparent antistatic finishes for CRT screens, aircraft, auto windows and the like.

The following specific examples are present to more particularly illustrate the invention and are not to be construed as limitations thereon.

EXAMPLE 1

To a solution containing 1770 mL of $H_2O$, 50 g of aniline (0.54 mole) and 172 g p-toluene sulfonic acid (0.90 mole) was added, dropwise at 15° C., a solution of ammonium persulfate (153.4 g in 336.5 mL $H_2O$) over a period of 40 minutes. After addition, the reaction was allowed to continue at 15° C. for a 0.5 hours.

The resultant solid precipitate was collected and washed with 6 L of an aqueous toluene sulfonic acid solution (10 wt. %) and then by 3 L of methanol. The resultant blue-black solid was dried in air for 25 hrs and dried at 130° C. for 3 hrs. under dynamic vacuum to give poly(aniline tosylate) as a green powder. The conductivity of the dried and pressed pellet formed from this material was 1 $Scm^{-1}$ as measured by the co-linear four-probe method. The conductivity of the moisture-saturated pellet was 20 $Scm^{-1}$.

The yield was 78 g. The intrinsic viscosity (in $H_2SO_4$, at 25° C.) was 0.66 dL/g. Elemental analysis of the dried green powder gave:

| C: 64.27 (Wt %) | H: 4.86% | N: 8.59% |
|---|---|---|
| S: 8.40% | O: 13.51% | |
| Moisture: less than 0.8 wt % | | |

EXAMPLE 2

Poly(aniline tosylate) (13 g) obtained from Example 1 was suspended in 270 mL of fuming sulfuric acid and stirred for 10 hrs. The resultant solution was then added dropwide to 2700 mL of methanol to precipitate the sulfonated polyaniline. The resultant sulfonated-polyaniline was collected by filtration, washed with 4 L of methanol, and then dried under dynamic vacuum for 15 hrs. The yield was 11 g. The conductivity of pellet formed from this material was measured (by a co-linear 4-probe method) and was 0.05-0.1 $Scm^{-1}$. Elemental analysis gave: C:52.81%, H:4.13%, N:10.07%, O:17.50%, S:10.84%

EXAMPLE 3

The above sulfonated polyaniline (40 g) was placed into a 500 mL glass beaker containing 250 mL of water. The polymer solid was insoluble and was settled down to the bottom of the beaker; the solution was colorless and transparent. A catalytic amount of pyridine was added to the solution. Some polymer dissolved into the solution, giving a blue solution with polymer solid settled on the bottom. Pieces of 5 inches by 5 inches colorless, transparent nylon 6 films were placed in the blued solution for about 5-20 minutes. The nylon films were blue-green in color and coated with the sulfonated-polyaniline when they were removed from the solution. The coatings were strongly adhered and could not be removed by scratching and rubbing against fingernails and paper towel, or by scotch tapes. The coatings rapidly turned greener within a few minutes. These films were air-drying for a few days before performing surface resistance measurements. The surface resistances, measured by a disc probe (Keithley 6105) ranged from $10^{-8}$ to $10^{-10}$ Ohm/sq.

What is claimed is:

1. A composition for use in phase transfer coating of a surface with one or more polyanilines having one or more acid functions substituted thereto, said composition comprises one or more polyanilines substituted with one or more acid functions bonded to one or more of the recurring phenylene groups of the polyaniline, a Lewis base capable of forming an acid/base complex with said acid functions of said polyanilines; and solution phase comprising a liquid having dissolved therein said polyaniline/Lewis base complex, said liquid, Lewis base and polyanilines selected such that removal of said liquid from said phase solidifies said polyanilines and releases said Lewis base from said complex forming solidified polyanilines.

2. A composition according to claim 1 wherein polyaniline is a homopolymer or copolymer comprising a substituted or unsubstituted polyaniline of the type derived from polymerizing an aniline or a mixture of anilines of the formula:

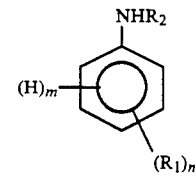

wherein
n is an integer from 1 to 5;
m is an integer from 0 to 5 with the proviso that the sum of n and m is equal to 5;
$R_1$ is deuterium alkyl, sulfonic acid, sulfonate, phosphinic acid, phosphinic acid salt, phosphinate, sulfinic acid, sulfinic acid salt, sulfinate, phosphonic acid, phosphonic acid salt, phosphonate, boric acid, borate, carboxylic acid, alkylsulfonylalkyl, arylthioaryl, carboxylate, alkenyl, alkoxy, aryloxycarbonyl, cycloalkyl, hydroxy, cycloalkenyl, alkanoyl, alkylthio, aryloxy, alkylarylamino, alkylthioaryl, alkylaryl, arylalakyl, aryloxy, alklthioalkyl, alklaryl, arylalkyl, sulfate, alkylsufinyl, alkoxyalkyl, amino, alkylamino, dialkylamino, diarylamino, arylamino, alkylsulfonyl, aryl, arylthio, arylsulfinyl, alkoxycarbonyl, nitro, alkylsilane, phosphinic acid, arylthioalkyl, aroyl, arylsulfonyl, ahlo, cyano, or substituted alkyl, aryl or alkoxy wherein permissible substitutents are one or more phosphonic acid, phosphonic acid salt, sulfonic acid, phosphinic acid, phosphinic acid salt, amino, alkylamino, dialkylamino, arylamino, diarylamino, boric acid, phosphinate, aroyl, sulfonic acid, phosphinic acid, phosphinic acid salt, amino, alkylamino, dialkylamino, arylamino, diarylamino, boric acid, phosphinate, aroyl, sulfinic acid, sulfinic acid salt, aryloxycarbonyl, arylalkylamino, sulfinate, sulfonate, borate, carboxylate, phosphonate, phosphate, sulfate, carboxylic acid, halo, nitro, hydroxy, cyano or epoxy moieties; or any two $R_1$ substituents or any one $R_1$ substituent and any $R_2$ substituent taken together may form a substituted or unsubstituted alkylene, alkenylene or alkynylene chain wherein permissible substitutents are one or more aryl, phosphate, sulfonic acid, sulfonate, amino, alkylamino, dialkylamino, arylamino, diarylamino, alkylarylamino, aroyl, phosphinic acid, phosphinic acid salt, phosphinate, sulfinic acid, sulfinic acid salt, sulfinate, halo, alkyl, alkoxy, hydroxy, alkylthio, alkylsulfinyl, phosphonic acid, phosphonic acid salt, phosphonate, sulfate, nitro, cyano, boric acid, borate, carboxylic acid or carboxylate, completing a 3, 4, 5, 6, 7, 8, 9 or 10 membered aromatic, heteroaromatic, heteralicyclic, or alicyclic carbon ring, which ring may optionally include one or more divalent ester, carbonyl, nitrogen, sulfur, phosphorus, sulfinyl, sulfonyl or oxygen, or $R_1$ or $R_2$ group is an aliphatic moiety having repeat units of the formula:

$(OCH_2CH_2)_qO-CH_3$, $O(CH_2CH(CH_3))_qO-CH_3$, $H_2)_qCF_3$, $(CF_2)_qCF_3$ or $(CH_2)_qCH_3$, with the proviso that at least one $R_1$ substituent is an acid function; and $R_2$ is the same or different at each occurrence and are $R_1$ substituents, or hydrogen.

3. A composition according to claim 2 wherein said homopolymer or copolymer is of the formula:

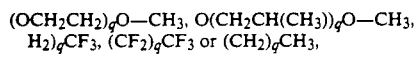

II

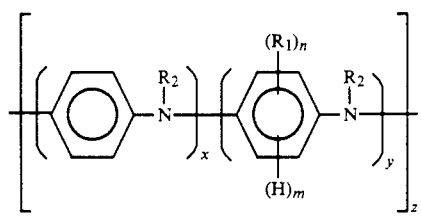

or

III

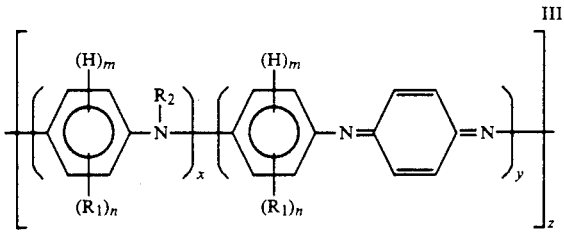

or

IV

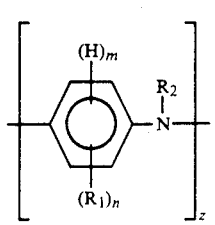

or

-continued

V

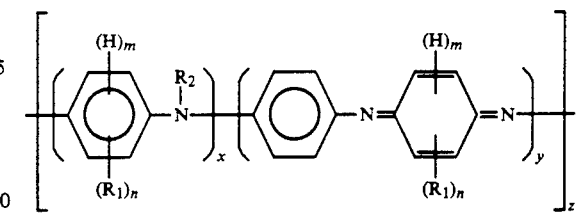

wherein:

x and y are the same or different and are integer equal to or greater than 0 with the proviso that the ratio of x to y is greater than 0;

z is an integer equal to or greater than about 1;

n is an integer from 1 to 4;

m is an integer from 0 to 4 with the proviso that the sum of n and m is 4;

$R_1$ is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid, phosphinic acid salt, phosphonic acid, phosphonic acid salt, alkylsilyl, boric acid, arylsulfonyl, carboxylic acid, halo, hydroxy, phosphate sulfonate, phosphonate, borate, phosphinate, carboxylate, nitro, cyano, sulfonic acid, sulfinic acid, sulfinic acid salt, sulfinate or alkyl or aryl substituted with one or more sulfinic acid, carboxylic acid, sulfinate, boric acid, sulfinic acid, sulfinic acid salt, halo, nitro, cyano, epoxy, hydroxy, sulfonate, phosphate, phosphonate, phosphinic acid, phosphinic acid salt, phosphinate, carboxylate, phosphonic acid, phosphonic acid salt, or borate moieties; or any two $R_1$ group or any one $R_1$ group and any $R_2$ group together may form an alkylene alkynylene, or alkenylene chain completing a 3, 5, 5, 6, 7, 8, 9 or 10 membered aromatic heteroaromatic, heteralicyclic or alicyclic carbon ring, which chain may optionally include one or more divalent nitrogen, ester, carbonyl, sulfur, sulfinyl, sulfonyl or oxygen, with the proviso that at least one $R_1$ substituent is an acid function; and $R_2$ is the same of different at each occurrence and is selected from the group consisting of $R_1$ substituents or hydrogen;

4. A composition according to claim 2 wherein m is from 3 or 4.

5. A composition according to claim 4 wherein m is 4.

6. A composition according to claim 2 wherein polyaniline is derived from substituted anilines.

7. A composition according to claim 2 wherein $R_2$ is hydrogen or alkyl of from 1 to about 4 carbon atoms.

8. A composition according to claim 2 wherein $R_1$ is the same or different at each occurrence and is alkyl or alkoxy having from 1 to about 30 carbon atoms, cyano, halo, hydroxy, or alkyl or alkoxy having from 1 to about 30 carbon atoms substituted with carboxylic acid, phosphonic acid, phosphonic acid salt, phosphinic acid, phosphinic acid salt, halo, phosphinate, carboxylate, sulfinic acid, sulfinic acid salt, sulfonic acid, sulfonate, sulfinate, or phosphonate substituents with the proviso that at least one $R_1$ substituent is an acid function.

9. A composition according to claim 8 wherein $R_1$ is the same or different at each occurrence and is sulfonic acid, sulfonate, or substituted or unsubstituted alkyl having from 1 to about 4 carbon atoms wherein permissible substituents are one or more sulfonic acid, sulfonate or a combination thereof with the proviso that at lest one $R_1$ substituent is an acid function; and $R_2$ is the same or different at each occurrence and is hydrogen or a $R_3$ substituent or alkyl having from 1 to about 4 carbon atoms.

10. A composition according to claim 9 wherein n is 1 and m is 4.

11. A composition according to claim 10 wherein $R_1$ is sulfonic acid, sulfonate or a combination thereof; and $R_2$ is $R_1$, hydrogen or alkyl having from 1 to about 4 carbon atoms.

12. A composition according to claim 10 wherein $R_2$ is hydrogen.

13. A composition according to claim 9 wherein $R_2$ is hydrogen, methyl or ethyl.

14. A composition according to claim 13 wherein $R_1$ is sulfonic acid and $R_2$ is hydrogen.

15. A composition according to claim 11 wherein z is equal to or greater than about 5.

16. A composition according to claim 15 wherein z is equal to or greater than about 10.

17. A composition according to claim 3 wherein said polyaniline is of the Formulas III or V.

18. A composition according to claim 17 wherein x is equal to or greater than about 1, with the proviso that the ratio of x to y is at least about 0.5.

19. A composition according to claim 18 wherein x is equal to or greater then about 1, with the proviso that the ratio of x to y is at least about 1.

20. A composition according to claim 19 wherein x is 2 and y is 1.

21. A composition according to claim 1 wherein said base has a pKa of greater than about 5.3 and is a liquid having a boiling point equal to or less than about 300° C. at 760 mm of Hg or a solid having a sublimation temperature equal to or less than about 300° C. at 760 Mm of Hg.

22. A composition according to claim 11 wherein said base has a pKa of greater than about 5.3 and is a liquid having a boiling point equal to or less than about 300° C. at 760 mm of Hg or a solid having a sublimation temperature equal to or less than about 300° C. at 760 Mm of Hg.

23. A composition according to claim 22 wherein said pH is greater than about 6.

24. A composition according to claim 23 wherein said pKa is greater than about 8.

25. A composition according to claim 24 wherein said boiling point or sublimation temperature is less than about 250° C.

26. A composition according to claim 25 wherein said boiling point or sublimation temperature is less than about 200° C.

27. A composition according to claim 26 wherein said boiling point or sublimation temperature is less than about 150° C.

28. A composition according to claim 27 wherein said base is an amine, diamine or phosphoramide.

29. A composition according to claim 28 wherein said base is pyrrolidine, piperidine, morpholine, pyridine, triethyl amine, tripropylamine or tributylamine.

30. A composition according to claim 1 wherein said liquid has a dielectric constant at 10°-30° C. equal to or greater than about 2.2

31. A composition according to claim 30 wherein said dielectric constant is equal to or greater than about 3.0.

32. A composition according to claim 23 wherein said dielectric constant is equal to or greater than about 4.0.

33. The composition according to claim 32 wherein said liquid is selected from the group consisting of water, dimethyl sulfoxide, amines and alcohol.

34. The composition according to claim 33 wherein said liquid is water.

* * * * *